Patented Mar. 31, 1936

2,036,009

UNITED STATES PATENT OFFICE 2,036,009

SYNTHETIC RESINS AND METHOD OF PREPARING THE SAME

James G. E. Wright, Alplaus, N. Y., assignor to General Electric Company, a corporation of New York No Drawing. Application July 21, 1931, Serial No. 552,292

4 Claims. (Cl. 106—22)

The present invention relates to synthetic resins and to a method of preparing the same. More specifically this invention is concerned with the production of a synthetic resin which is acid, alkali, water and flame-proof, which is moldable, capable of being cured, and which can be made as a product of any desired degree of plasticity and flexibility.

Vinyl compounds have heretofore been utilized in the preparation of synthetic resins. For example, one well known resin of this type is prepared by first dissolving polymerized vinyl acetate in a solvent such as toluol. Vinyl chloride, which is a gas under ordinary conditions, is conducted into this solution and maintained therein under pressure. Under the influence of heat, light and an oxidizing catalyst, for example, benzoyl peroxide, the vinyl chloride polymerizes and associates itself in intimate relationship with already polymerized vinyl acetate. The excess solvent is distilled off and a resinous product remains which is readily moldable.

In the resin above described the vinyl chloride usually preponderates over the vinyl acetate, the ratio being ordinarily 4 to 1. The vinyl chloride ingredient in the resin is acid, alkali, water and flame-proof, but is not very plastic by itself. For example, when an attempt is made to sheet it on ordinary rubber compounding rolls it behaves pretty much like dry gelatin. The vinyl acetate ingredient is, on the other hand, very plastic and adhesive to metal and other substances, but is not at all water resistant. The compounded ingredients, in the proportions above noted and prepared as outlined, give a resin embodying the desirable properties of each ingredient and a product which is thermoplastic in character. This thermoplastic resin is one which has less shrinkage in the mold than any other known moldable synthetic resin.

The most expensive ingredient in the above resin is the polymerized vinyl acetate. It has long been desired to replace this ingredient with a cheaper material which would be compatible with the vinyl chloride and yield a resin having the desirable properties of the above mentioned resin. Again, because of the fact that the resin is thermoplastic in character it has not been possible in many cases to utilize in a practical way the other desirable properties of the resin since, as is well known, a resin which cannot be cured to the infusible state and which softens again on heating, although hard when cold or at room temperature, is limited in many industrial and technical applications.

I have made the discovery that I can utilize alkyd resins, and more particularly those alkyd resins which are flexible in character, to replace the vinyl acetate ingredient in the resin above referred to. I have found that such resins are compatible with the polymerized vinyl chloride, can be easily and successfully compounded therewith by an exceedingly simple procedure to yield a product which embodies all the properties and advantages of the polymerized vinyl chloride enumerated above and in addition surprisingly gives a product which is easily heat convertible to the infusible state, particularly where a small amount of a catalyst such as zinc oxide is added. Moreover the expensive vinyl acetate is in this manner replaced by a cheaper and for many purposes, a better material.

As is well known, alkyd resins include all those complexes resulting primarily from the inter-reaction of a polyhydric alcohol, such as glycerine, with a polybasic acid, such as phthalic acid or its anhydride, with or without other reacting ingredients.

In order that my invention may be more fully understood and practiced by those skilled in the art to which it pertains, the following illustrative examples are given:

Example I

| Ingredients | Per cent by weight |
|---|---|
| Polymerized vinyl chloride | 40 |
| Alkyd resin | 10 |
| Dibutyl phthalate | 30 |
| Alpha cellulose | 7.5 |
| Titanium oxide pigment | 12.5 |
| Total | 100.0 |

An alkyd resin was first prepared by reacting

| | Per cent by weight |
|---|---|
| Glycerine | 17.6 |
| Phthalic anhydride | 42.5 |
| Ethylene glycol | 28.0 |
| Adipic acid | 11.9 |

The resin ingredients are cooked in a suitable vessel, for example an aluminum container, to a 30 second cure at 200° C. The mass is poured into an amalgamated pan to a thickness of approximately ¼ inch. The resin then is cured for about 22 hours at a temperature of approximately 150° C., the sheet being turned over at the end of 11 hours to expose the under side.

The resin is now in the so-called B-stage or semi-cured stage. The resin is one containing a 1:2 ratio of polyhydric alcohol-polybasic acid ester to dihydric alcohol-dibasic aliphatic acid ester, that is, glycerol phthalate to glycol adipate and is quite flexible in nature.

This alkyd resin is milled with the other ingredients above mentioned on an ordinary type of rubber compounding rolls for about ½ hour at a temperature of about 95° C. It can then be molded in the ordinary type of hydraulic press utilizing a temperature range of approximately 70° to 95° C. and a pressure range of 300–2500 pounds per square inch. The molded product may be cured to the infusible state outside of the mold employing a temperature range of approximately 80° to 100° C. for a time up to approximately 22 hours.

The molded product prepared as described in this example is flexible. It molded easily, did not stick to the mold, and took sharp impressions.

Example II

| Ingredients | Per cent by weight |
|---|---|
| Alkyd resin | 57.1 |
| Polymerized vinyl chloride | 14.2 |
| Alpha cellulose | 11.0 |
| Titanium oxide pigment | 17.7 |
| | 100.0 |

The alkyd resin is prepared as outlined in Example I. The molded product, uncured, was exceedingly flexible in character, and pliable like soft rubber.

Example III

| Ingredients | Per cent by weight |
|---|---|
| Polymerized vinyl chloride | 35 |
| Alkyd resin | 35 |
| Diatomaceous earth | 25 |
| Zinc oxide | 5 |
| | 100 |

The alkyd resin in this example may be prepared as in Example I and compounded in the same manner with the other ingredients. The molded product took sharp impressions and did not stick to the mold. It had a glass-like surface. The molded product was cured outside of the mold and held its shape excellently.

Example IV

| Ingredients | Per cent by weight |
|---|---|
| Alkyd resin | 42.5 |
| Alpha cellulose | 10.7 |
| Titanox B | 42.5 |
| Polymerized vinyl chloride | 4.3 |
| | 100.0 |

In this example the alkyd resin may be prepared as in Example I, but the ratio of ingredients is so chosen that the ratio of glycerol phthalate to glycol adipate is 1:6 instead of 1:2, as in Example I. The compounding of the ingredients is carried out as in that example. The molded product in this case is soft and pliable like rubber as the product in Example II. It retains its flexibility at low temperatures (about −12° C.), and even when not cured has excellent water resistance.

The above examples clearly illustrate the invention but it is apparent that the ingredients and proportions thereof may be varied. For example, the alkyd resin may be one other than that specifically mentioned in the examples. That is, other polybasic acids besides phthalic acid or its anhydride and polyhydric alcohols other than glycerine, especially those having three or more hydroxyl groups in the molecule, may be employed in making the alkyd resin. Within the scope of the present invention is also included alkyd resins prepared by reacting the resin ingredients in the presence of vegetable oils, such as the drying or semi-drying oils and/or the acids derived therefrom. In making the flexible type of alkyd resin dihydric alcohols other than ethylene glycol may be used, for example, propylene glycol, diethylene glycol, tetramethylene glycol and the like; and the dibasic aliphatic acid need not be adipic acid, it may be such an acid as succinic, malic, maleic, fumaric, glutaric, pimelic, azelaic, suberic acid and the like, or a suitable combination of these acids. By varying the ratio of polyhydric alcohol-polybasic acid ester to the dihydric alcohol-dibasic aliphatic acid ester in the flexible type of alkyd resin various degrees of toughness and flexibility can be obtained in the finished resin.

It is of course understood that fillers other than alpha cellulose and diatomaceous earth may be used, these being merely representative of any number of suitable fillers available and which will readily suggest themselves to those skilled in the art.

Suitable equivalents of polymerized vinyl chloride may of course be employed and are deemed within the scope of the present invention.

What I claim as new and desire to secure by Letters Patent of the United States is:—

1. A resinous composition capable of being cured to the infusible state which comprises polymerized vinyl chloride and a semi-cured alkyd resin which is the product of reaction of glycerine, phthalic anhydride, ethylene glycol and adipic acid.

2. A resinous composition capable of being cured to the infusible state which comprises a polymerized vinyl halide and a semi-cured alkyd resin which is the product of reaction of a polyhydric alcohol, a polybasic organic acid, a dihydric alcohol and a dibasic aliphatic acid.

3. An article comprising essentially the cured resinous composition of claim 1.

4. An article comprising essentially the cured resinous composition of claim 2.

JAMES G. E. WRIGHT.